(12) United States Patent
Sharp

(10) Patent No.: US 7,957,122 B2
(45) Date of Patent: Jun. 7, 2011

(54) PANELBOARD PLUG-ON NEUTRAL WITH BREAKER MOUNTING

(76) Inventor: Jeffrey O. Sharp, Lexington, KY (US)

(*) Notice: Subject to any disclaimer, the term of this patent is extended or adjusted under 35 U.S.C. 154(b) by 55 days.

(21) Appl. No.: 12/498,062

(22) Filed: Jul. 6, 2009

(65) Prior Publication Data

US 2011/0002089 A1    Jan. 6, 2011

(51) Int. Cl.
*H02B 1/04* (2006.01)
(52) U.S. Cl. ........ 361/673; 361/627; 361/634; 361/637; 361/648; 361/652; 200/1 R; 200/307; 200/330; 174/67; 174/72 B
(58) Field of Classification Search .......... 361/600–602, 361/622, 625, 627–632, 634–638, 641–648, 361/652, 656, 653, 655, 673; 200/1 R, 50.1, 200/50.34–39, 50.4, 51 R, 51.11, 51.12, 296, 200/297, 303, 307, 294, 318; 439/710–715, 439/723, 724, 218, 884, 82, 83, 79, 115, 439/116, 209, 101, 102; 174/65 R, 149 B, 174/166 R, 70 B, 68.2, 88 B, 129 B, 133 B, 174/171, 66, 67, 68
See application file for complete search history.

(56) References Cited

U.S. PATENT DOCUMENTS

| | | | | |
|---|---|---|---|---|
| 2,914,708 | A * | 11/1959 | Harold | 361/634 |
| 3,218,519 | A * | 11/1965 | Casey | 361/656 |
| 3,339,119 | A * | 8/1967 | Stanback et al. | 361/634 |
| 3,349,292 | A * | 10/1967 | Meacham | 361/648 |
| 4,079,439 | A * | 3/1978 | Coles et al. | 361/637 |
| 4,142,225 | A * | 2/1979 | Diersing et al. | 361/647 |
| 4,167,769 | A * | 9/1979 | Luke et al. | 361/637 |
| 4,251,851 | A * | 2/1981 | Diersing et al. | 361/652 |
| 4,449,296 | A * | 5/1984 | Luke et al. | 29/883 |
| 4,667,269 | A * | 5/1987 | Morby et al. | 361/638 |
| 5,134,543 | A | 7/1992 | Sharp et al. | |
| 5,179,491 | A * | 1/1993 | Runyan | 361/45 |
| 5,450,282 | A * | 9/1995 | Webber et al. | 361/637 |
| 6,266,232 | B1 * | 7/2001 | Rose et al. | 361/645 |
| 7,417,849 | B2 * | 8/2008 | Dixon et al. | 361/634 |
| 7,449,645 | B1 * | 11/2008 | Flegel | 200/51.11 |
| 7,508,653 | B2 * | 3/2009 | Parlee | 361/652 |
| 7,772,723 | B1 * | 8/2010 | Flegel | 307/125 |
| 2008/0003850 | A1 | 1/2008 | Seff et al. | |
| 2008/0158787 | A1 * | 7/2008 | Parlee | 361/641 |

OTHER PUBLICATIONS

Eaton Product Brochure, Plug into Savings with the CH Plug-on Neutral Loadcenter and AFCI and GFCI Breakers (2006); 4 pages.

* cited by examiner

*Primary Examiner* — Michael V Datskovskiy

(57) ABSTRACT

A load center is equipped with a neutral phase conductive rail with breaker mounting and retention features providing automatic neutral connection for a plug-on mounted AFI and/or GFI circuit breaker. Breakers may be designed to have specific interfaces to the breaker mounting and retention features of the load center rails. The neutral rail may have two pieces including a breaker undercut positioning rail shorted to a standard neutral rail, or a neutral rail may be designed to have all mounting features integrated therewith. The new panel is compatible with non-AFI and non-GFI breakers.

14 Claims, 9 Drawing Sheets

PANELBOARD PLUG-ON NEUTRAL WITH BREAKER MOUNTING

FIELD OF THE INVENTION

The present invention relates to electrical distribution panels, or loadcenters, and to circuit breakers for use in the same.

BACKGROUND OF THE INVENTION

Arc-fault interruption (AFI) and ground-fault interruption (GFI) circuit breakers are well known. Such circuit breakers have traditionally required an extra conductor, called a "pigtail," to connect the breaker to a neutral bar of an electrical distribution panel or loadcenter. Increased use of arc fault circuit breakers in a residential loadcenter results in additional pigtails in the wiring gutter of the loadcenter, making it more difficult to wire.

More recently, electrical distribution panels have been developed featuring a "plug-on neutral." Instead of requiring a pigtail, the circuit breaker is provided with a connector that directly plugs onto the neutral bar of the electrical distribution panel. However, certain disadvantages remain. In the case of one known panel, AFI/GFI breakers are extended in length in comparison to ordinary circuit breakers to reach a neutral bar in order to plug onto the same. Furthermore, the plug-on connection is susceptible to accidental dislodgement. In the case of another known panel, the plug-on neutral is of a square configuration. If a circuit breaker installed on the plug-on neutral is removed using a motion that is common for other types of circuit breakers, the plug-on neutral connection on the circuit breaker is liable to be damaged, interfering with reinstalling of the breaker.

BRIEF SUMMARY OF ASPECTS OF THE INVENTION

Aspects of the present disclosure are directed to electrical distribution panels and circuit breakers that eliminate the need for a pigtail connection for an AFI/GFI or other type of circuit breaker. In an embodiment, a mounting or positioning rail, separate from a panel neutral bus bar, is made of a conductive material and is connected electrically to the neutral bus bar. Mounting the circuit breaker to the mounting or positioning rail completes an electrical connection to neutral that would otherwise be made using the pigtail connection. The mounting or positioning rail may be generally "L" shaped such that an interlocking sequence of motions is required to install and to remove the circuit breaker such that the circuit breaker is not susceptible to accidental dislodgement. In another embodiment, a plug-on neutral bus bar is made to have a rounded cross-section. If a circuit breaker installed on the plug-on neutral is removed using a motion that is common for other types of circuit breakers, the connector connected to the rounded plug-on neutral of the circuit breaker is not damaged, allowing the breaker to be easily reinstalled. Advantageously, wiring clutter is also significantly reduced.

The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

DETAILED DESCRIPTION OF THE ILLUSTRATED EMBODIMENTS

Although the invention will be described in connection with certain aspects and/or embodiments, it will be understood that the invention is not limited to those particular aspects and/or embodiments. On the contrary, the invention is intended to cover all alternatives, modifications, and equivalent arrangements as may be included within the spirit and scope of the invention as defined by the appended claims.

Figure 1A:
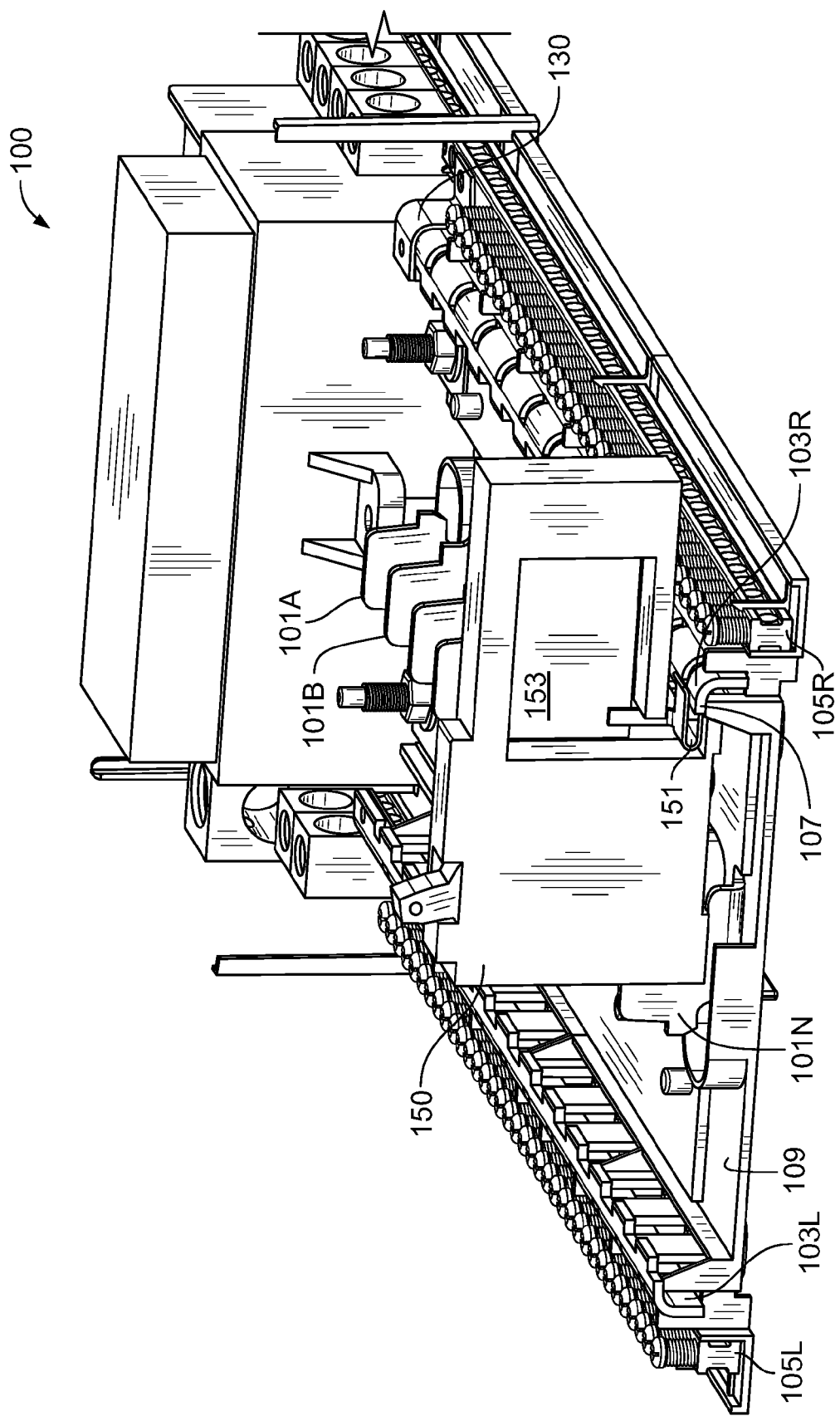
FIG. 1A is a perspective view of an electrical distribution panel and an installed circuit breaker, with separate mounting or positioning rails and neutral bus bars.

Referring now to FIG. 1A, a perspective view is shown of an interior of an electrical distribution panel or loadcenter 100 and an installed circuit breaker 150, portions of the circuit breaker 150 being shown in cut-away view. The loadcenter 100 is arranged to receive side-by-side circuit breakers in two parallel rows in known fashion. In a center section of the loadcenter 100, panel connectors 101A, 101B, . . . , 101N are provided that engage corresponding conventional plug-on line jaw connectors (not shown) of each of the circuit breakers and connect the circuit breakers to line current. Along a right-hand side of an interior of the panel or loadcenter 100 are provided a mounting or positioning rail 103R and a neutral bus bar (or rail) 105R. Along a left-hand side of an interior of the loadcenter 100 are provided a mounting or positioning rail 103L and a neutral bus bar 105L. Both the positioning rails 103 and the neutral bus bars 105 are made of conductive material. The positioning rail 103R is electrically shorted to the neutral bus bar 105R via a conductive shorting strap 130, and the positioning rail 103L is electrically shorted to the neutral bus bar 105L via a conductive shorting strap (not visible in the drawing). Other structures of the loadcenter 100 include a trip unit, lug connections, etc., none of which is central to an understanding of the present invention. The positioning rail 103 can be added to conventional panelboards without having to redesign the panels. Once installed into the panelboard, the positioning rail 103 is simply shorted to the conventional neutral bus bar 105 by the conductive shorting strap 130. No further modification to a conventional panelboard is needed.

The circuit breaker 150 is provided with a plug-on neutral connector 151 that engages the positioning rail 103R. In the illustrated embodiment, the positioning rail 103R is angular in cross section having a generally rounded "L" shape, for example, having a bent portion that receives the plug-on neutral connector 151. The plug-on neutral connector 151 may be formed in the manner of a clip that clips onto a rounded bent-over portion 107 of the positioning rail 103R. The bent-over portion 107 has a flat surface that is parallel to the back or bottom surface of the panel or loadcenter 100. The bent-over portion 107 is rounded to allow unimpeded rotation of the circuit breaker 150 about the rounded bent-over portion 107 during installation and removal. The plug-on neutral connector 151 connects to a circuit board 153 inside the circuit breaker 150, for example, shown in cut-away view. The plug-on neutral connector 151 interface (i.e., the opening to the clip portion of the plug-on neutral connector 151) is oriented parallel to the back or bottom surface 109 of the panel 100 when the circuit breaker 150 is installed therein, as shown in FIG. 1A.

Figure 1B:
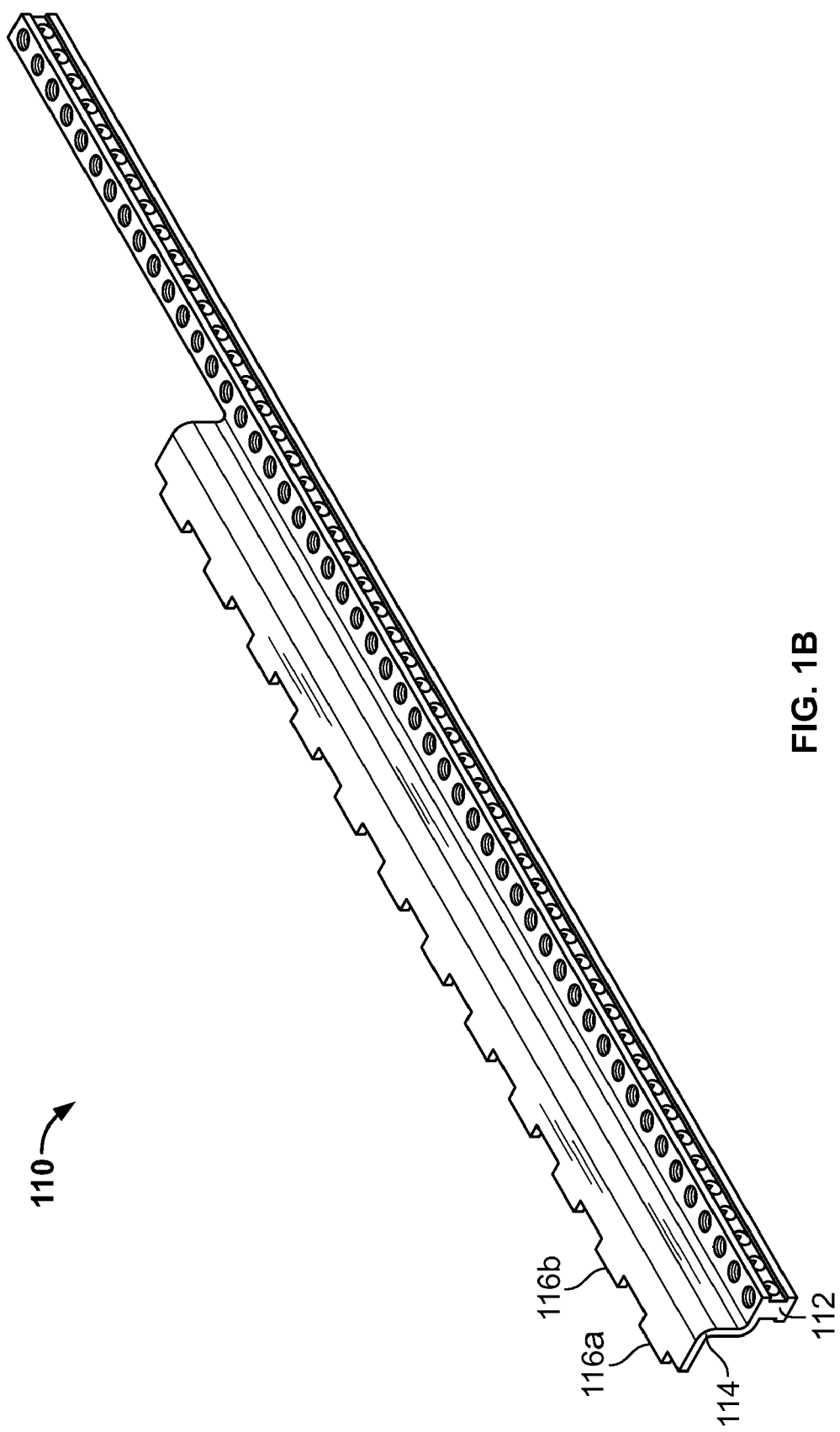
FIG. 1B is a perspective view of a rail assembly having a mounting or positioning rail integrated with a neutral bus bar.

As explained above, in FIG. 1A, the positioning rails and neutral bus bars are separate from one another and electrically shorted together within the panel 100 by the shorting strap 130. A variation is shown in FIG. 1B, in which a combined rail assembly 110 has a mounting or positioning rail 114 integrated as a single part with a neutral bus bar 112. The positioning rail 114 includes a plurality of alternating protrusions or mounting tabs 116a,b (only two are numbered for ease of illustration) and recesses for providing registration and retention of the circuit breakers when installed in the panel or loadcenter 100. The plug-on neutral connector 151 engages a corresponding tab 116 when the circuit breaker 150 is installed into the panel 100. The alternating bent tabs and corresponding recesses along with the rounded bent-over portion 107 provide a retention feature to aid in securely retaining the circuit breakers into the panel or loadcenter 100. In other words, by "retention," it is meant that the retention feature is responsible for mechanically securing the circuit breaker 150 to the panel or loadcenter 100. In other words, by "retention," it is meant that the retention feature is responsible for mechanically securing the circuit breaker 150 to the panel or loadcenter 100 in more than one axis, such as more than one axis of rotation. For example, the circuit breaker 150 cannot be mechanically separated from the panel 100 by merely pulling the circuit breaker 150 in one linear axial direction away from the panel 100. No additional mechanical couplings are required or necessary to mechanically secure the circuit breaker 150 to the panel or loadcenter 100, though they are not precluded however unnecessary. The mounting tabs 116a,b receive the corresponding neutral connectors in the circuit breakers installed within the panel 100. The rail assembly 110 can be installed in the same panel 100 shown in FIG. 1A. No electrical shorting between the positioning rail 114 and the neutral bus bar 112 is necessary because they are made of an electrically conductive material and formed as an integral part. An identical left-mounted rail assembly is installed on the left side of the panel 100 for connecting left-mounted circuit breakers to panel neutral.

Figure 2:
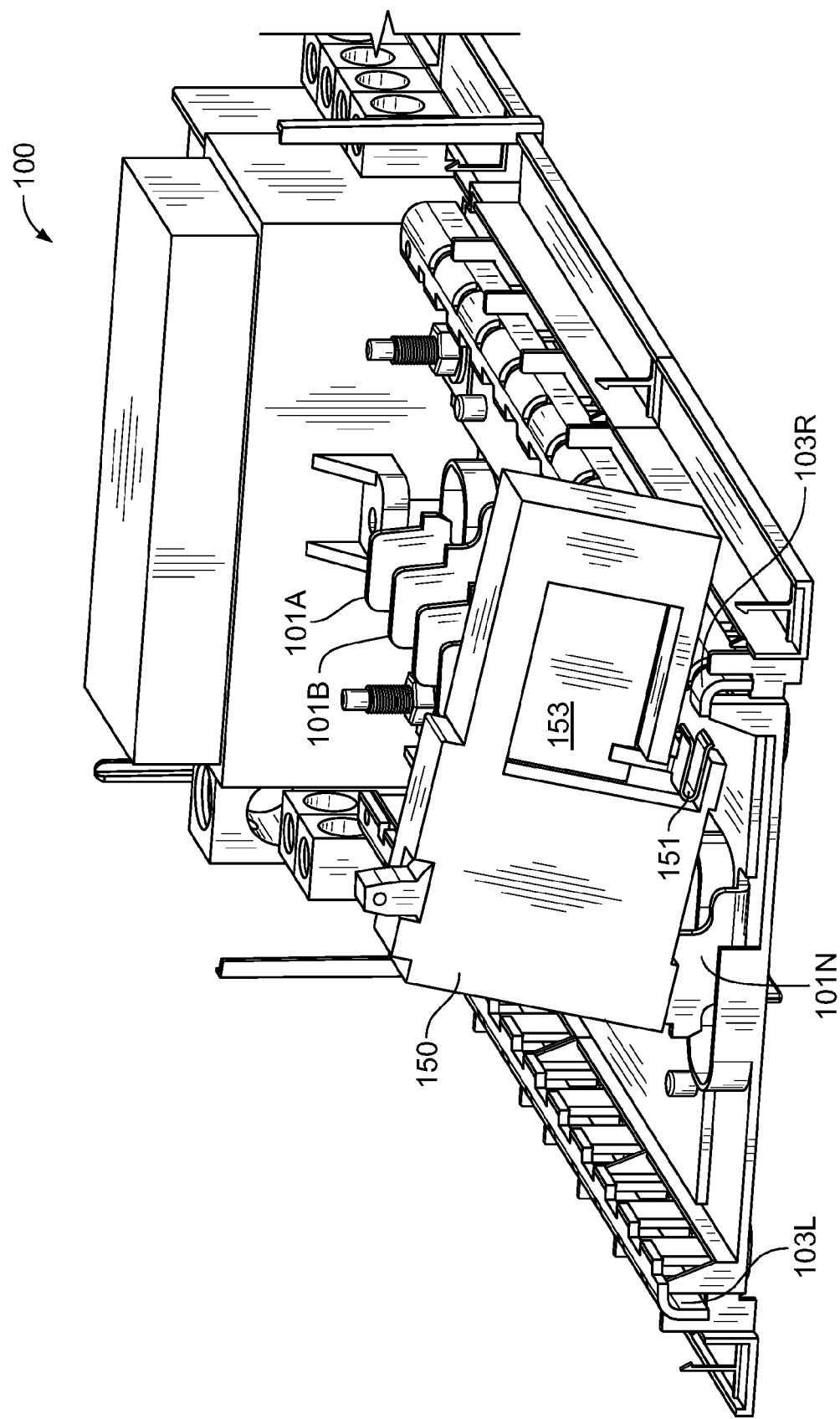
FIG. 2 is a perspective view of the electrical distribution panel and installed circuit breaker of FIG. 1, showing the circuit breaker in a position midway during installation.
Figure 3:
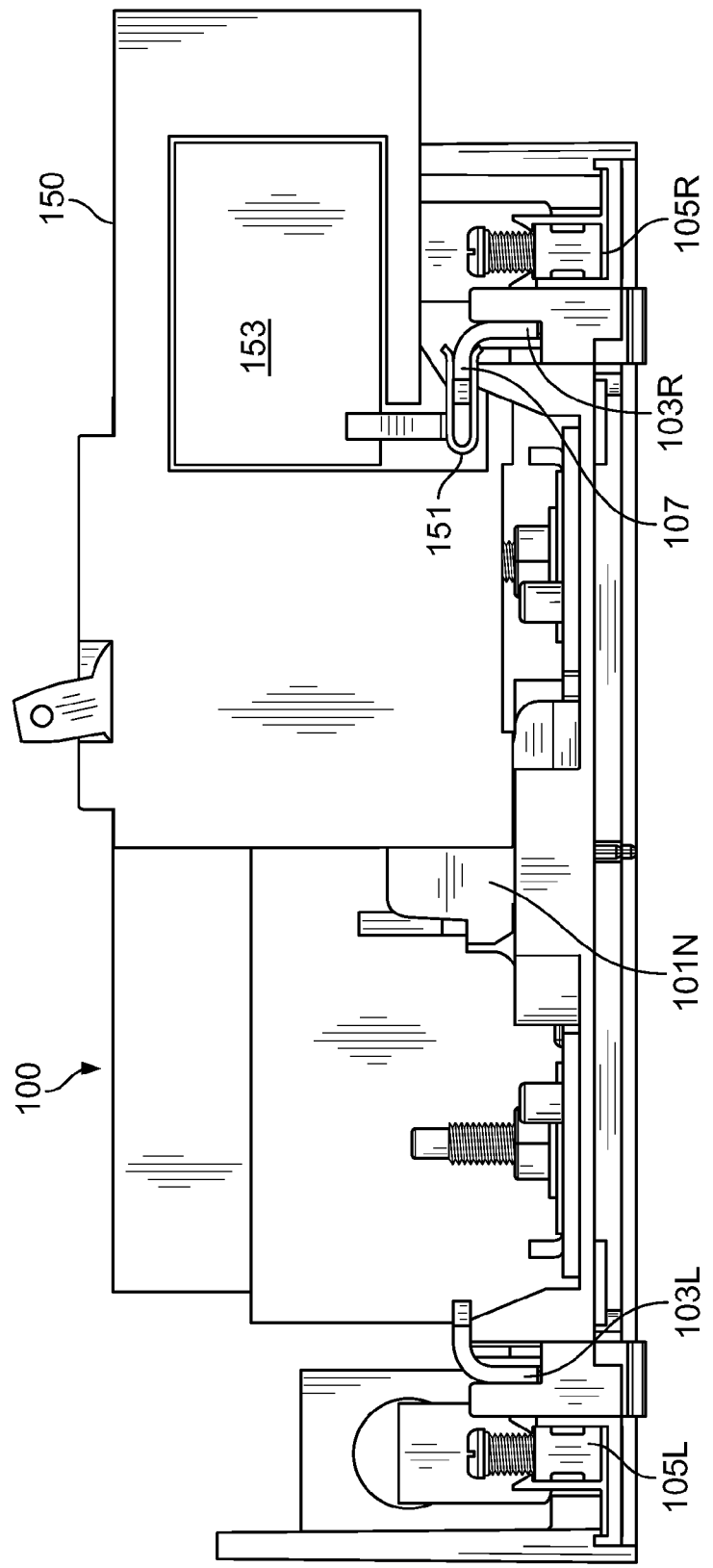
FIG. 3 is an end view of the electrical distribution panel and installed circuit breaker of FIG. 1.

Referring to FIG. 2 (in which the neutral bus bars 105R and 105L have been omitted for clarity), the circuit breaker 150 is installed by first causing the plug-on neutral connector 151 to engage one of the protruding tabs in the bent-over portion 107 of the positioning rail 103R using a motion having component parallel to the back or bottom surface plane 109 of the loadcenter 100. Then, the left-hand side of the circuit breaker 150 is rotated downward to engage the plug-on line jaw connector inside the circuit breaker 150 to the panel connector 101N. Installation of the circuit breaker 150 therefore requires an uninterrupted sequence of defined non-linear, consecutive motions. In other words, the first motion moving the circuit breaker 150 in a direction parallel to the back or bottom surface plane 109 is generally orthogonal to the second motion moving the circuit breaker downward toward the back or bottom surface plane 109. An end view of the circuit breaker 150 installed in the panel or loadcenter 100 is shown in FIG. 3. Once installed, the circuit breaker 150 is secure and relatively insusceptible to accidental dislodgement. The sequence of defined non-linear motions is also instrumental in mechanically securing the circuit breaker 150 to the panel or loadcenter 100 in more than one axis. Because two distinct non-linear motions are required to install or remove the circuit breaker 150, it cannot be installed or accidentally dislodged or intentionally removed in a single motion.

Figure 4A:
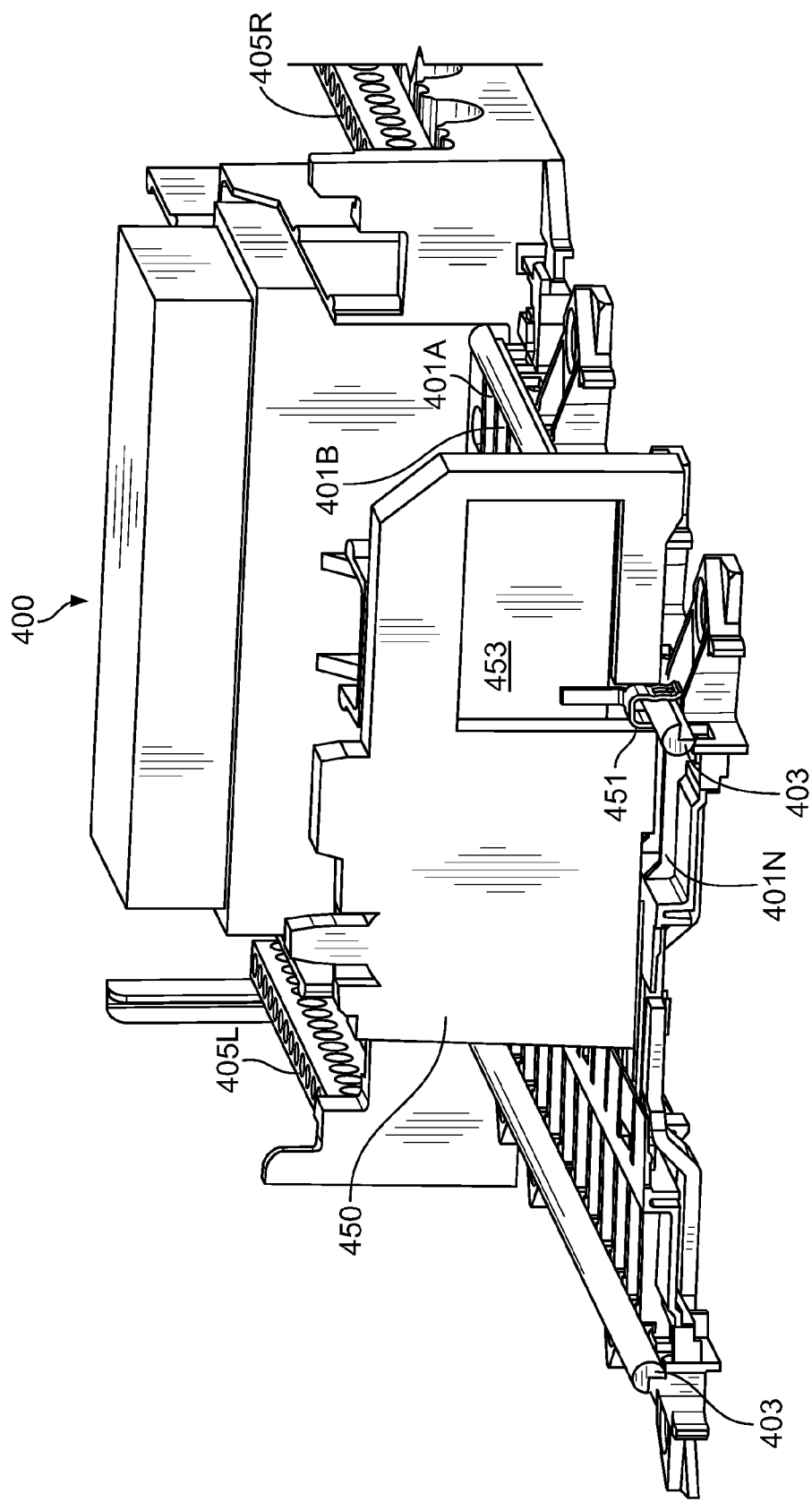
FIG. 4A is a perspective view of an electrical distribution panel and an installed circuit breaker, portions of the circuit breaker being shown in cut-away view.
Figure 4B:
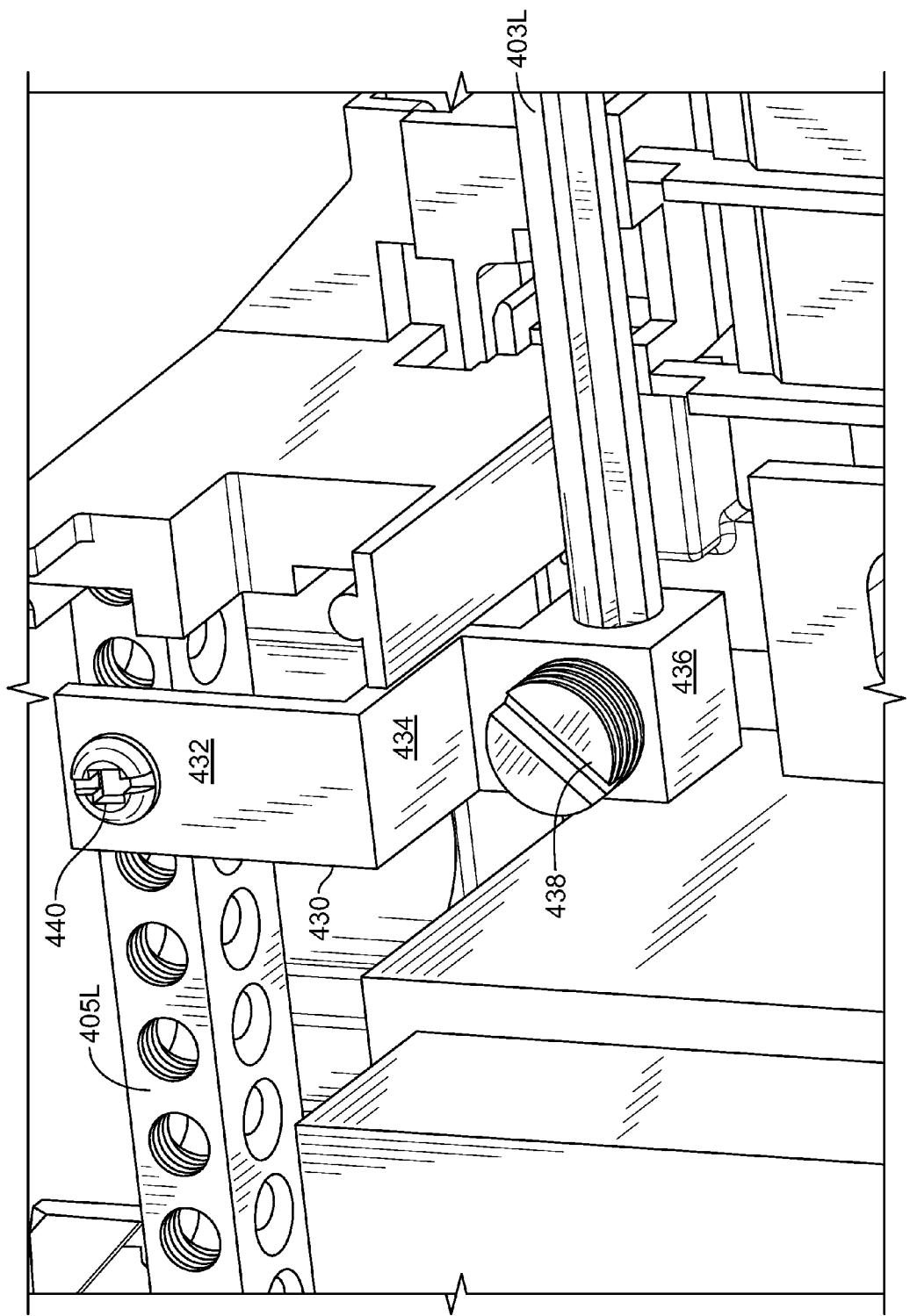
FIG. 4B is a perspective close-up view of a shorting strap for electrically shorting the undercut positioning rail to the neutral bus bar shown in FIG. 4A.

Referring now to FIG. 4A, a perspective view is shown of an electrical distribution panel or loadcenter 400 and an installed circuit breaker 450, portions of the circuit breaker 450 being shown in cut-away view to expose a circuit board 453. The loadcenter 400 is arranged to receive side-by-side circuit breakers in two parallel rows in known fashion. In a center section of the loadcenter 400, line-side plug-on connectors 401A, 401B, . . . , 401N are provided that engage each of the circuit breakers and connect the circuit breakers to line current. Along a right-hand side of the loadcenter 400 is provided a neutral bus bar 405R and an undercut positioning rail 403R. Whereas the loadcenter 100 in FIG. 1A shows a separate positioning rail 103 and neutral bus bar 105 that are shorted together, the loadcenter 400 in FIG. 4A has a single rail 403L,R that serves the dual purpose of providing a mounting structure for the circuit breaker and providing a neutral connection thereto. Along a left-hand side of the loadcenter 400 is provided a neutral bus bar 405L and an undercut positioning rail 403L. The undercut positioning rails 403 are made of conductive material and are connected to the panel neutral via a shorting strap 432 shown in FIG. 4B. The shorting strap 434 includes a first portion 432 connected via a screw 440 to the neutral bus bar 405 and a second portion 436 connected via a screw 438 to the undercut positioning rail 403. Other structures of the loadcenter 400 include a trip unit, lug connections, etc., none of which is central to an understanding of the present invention. The undercut positioning rail 403 includes a cutout 462 shown in FIG. 6B underneath the rail 403 for reasons explained in more detail below. The cutout is formed along a surface of the undercut positioning rail 403 that faces the panel or loadcenter 400. The top portion of the undercut positioning rail 403 is rounded.

The circuit breaker 450 is provided with a plug-on neutral connector 451 that engages the undercut positioning rail 403R, which has a rounded top surface that receives the plug-on neutral connector 451 (e.g., circular, for example), and a cutout 462 along the bottom of the rail 403 that faces the panel or loadcenter 400. The rounded top profile of the rail 403 prevents the plug-on neutral connector 451 from becoming distorted during rotation of the circuit breaker 450 as it is being mounted to or removed from the rail 403. The plug-on neutral connector 451 can be formed in the manner of a clip or jaw that clips securely onto the rounded portion of the undercut positioning rail 403R. The plug-on neutral connector 451 connects to a circuit board 453 inside the circuit breaker 450, for example, shown in cut-away view. In contrast with the connector plug-on neutral 151 shown in FIG. 1A, the neutral bar-receiving opening of the plug-on neutral connector 451 faces downward toward surface of the panel. Downward pressure on the top of the circuit breaker 450 causes the plug-on neutral connector 451 and a plug-on line jaw connector 455 to securely snap into their respective neutral rails 403R,L and line panel connectors 401.

Figure 5:
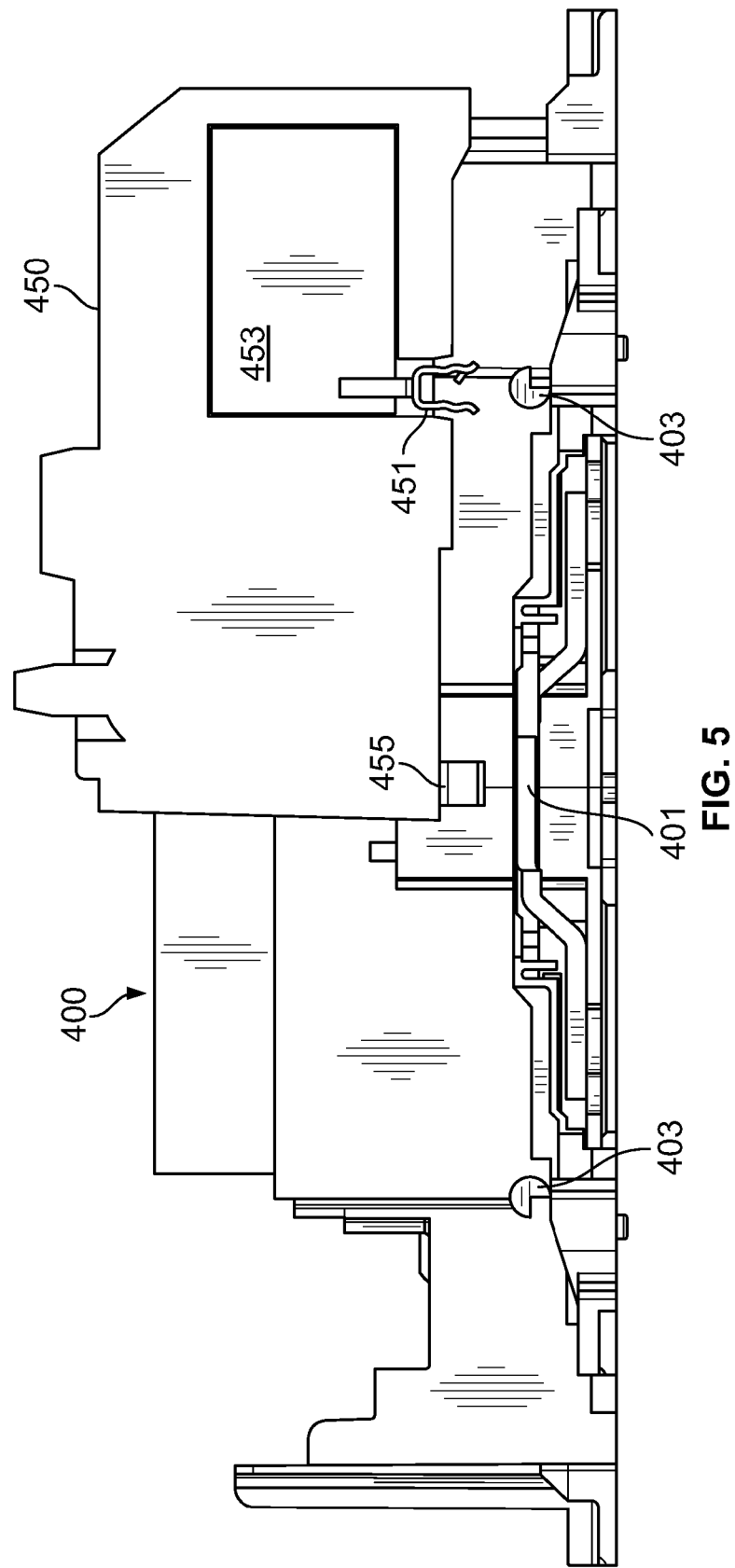
FIG. 5 is a perspective view of the electrical distribution panel and installed circuit breaker of FIG. 4, showing the circuit breaker in a position midway during installation.

Referring to FIG. 5, the circuit breaker 450 may be installed by simultaneous downward motion of both sides of the circuit breaker, causing the plug-on neutral connector 451 to engage the undercut positioning rail 403R and causing the plug-on line jaw connector 455 to engage the line-side connector 401N. An end view of the circuit breaker 450 installed in the loadcenter 100 is shown in FIG. 6. Once installed, the circuit breaker 450 can be removed by simultaneous upward motion of both sides of the circuit breaker 450; or, the circuit breaker 450 can be removed in a sequence of defined non-linear motions that include an upward motion of the left-hand side of the circuit breaker 450, a rotating motion toward the right-hand side of the circuit breaker causing the plug-on neutral connector 451 to rotate around the rounded undercut positioning rail 403R, followed by upward motion of the right-hand side of the circuit breaker 450, detaching the plug-on neutral connector 451 from the undercut positioning rail 403R. That is, if a circuit breaker 450 installed on the undercut positioning rail 403R is removed using a motion that is common for other types of circuit breakers, the plug-on neutral connector 451 connected to the rounded undercut positioning rail 403R of the loadcenter 400 is not damaged, allowing the breaker 450 to be easily reinstalled.

Figure 6A:
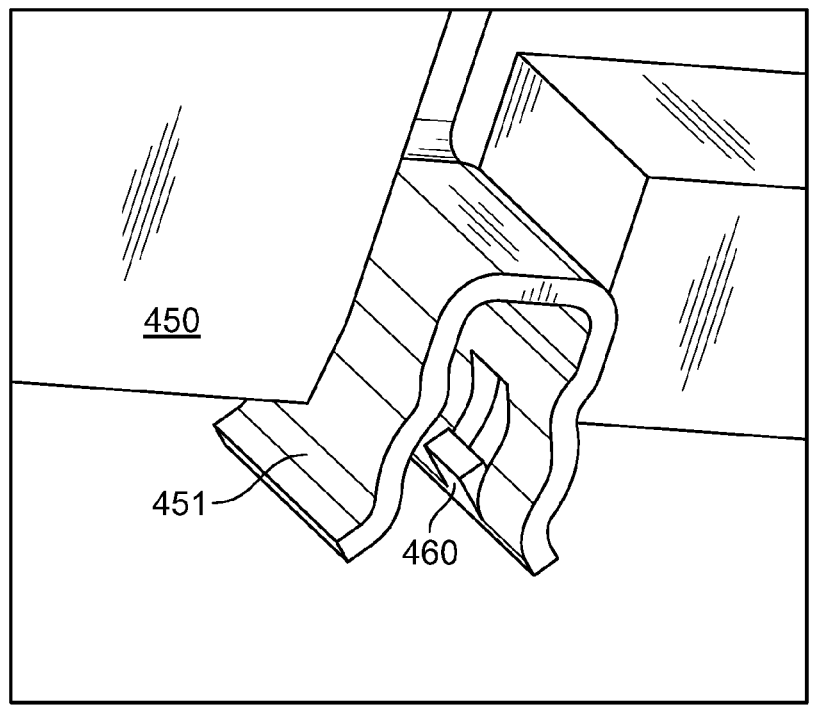
FIG. 6A is a perspective close-up view of a plug-on neutral connector having a hooked retaining member 460.
Figure 6B:
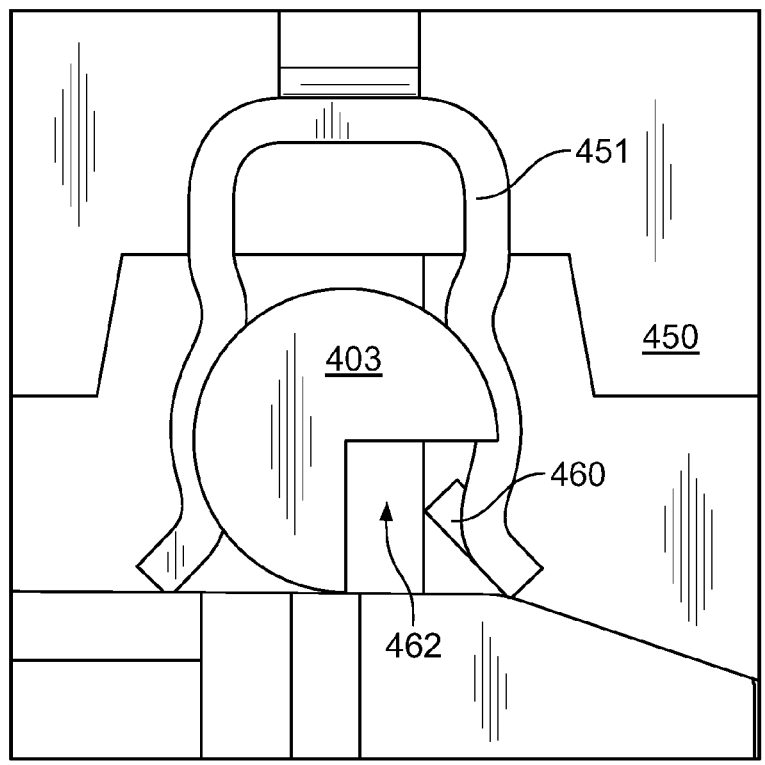
FIG. 6B is an end view of the plug-on neutral connector shown in FIG. 6A installed over an undercut positioning rail shown in FIG. 4A.
Figure 6C:
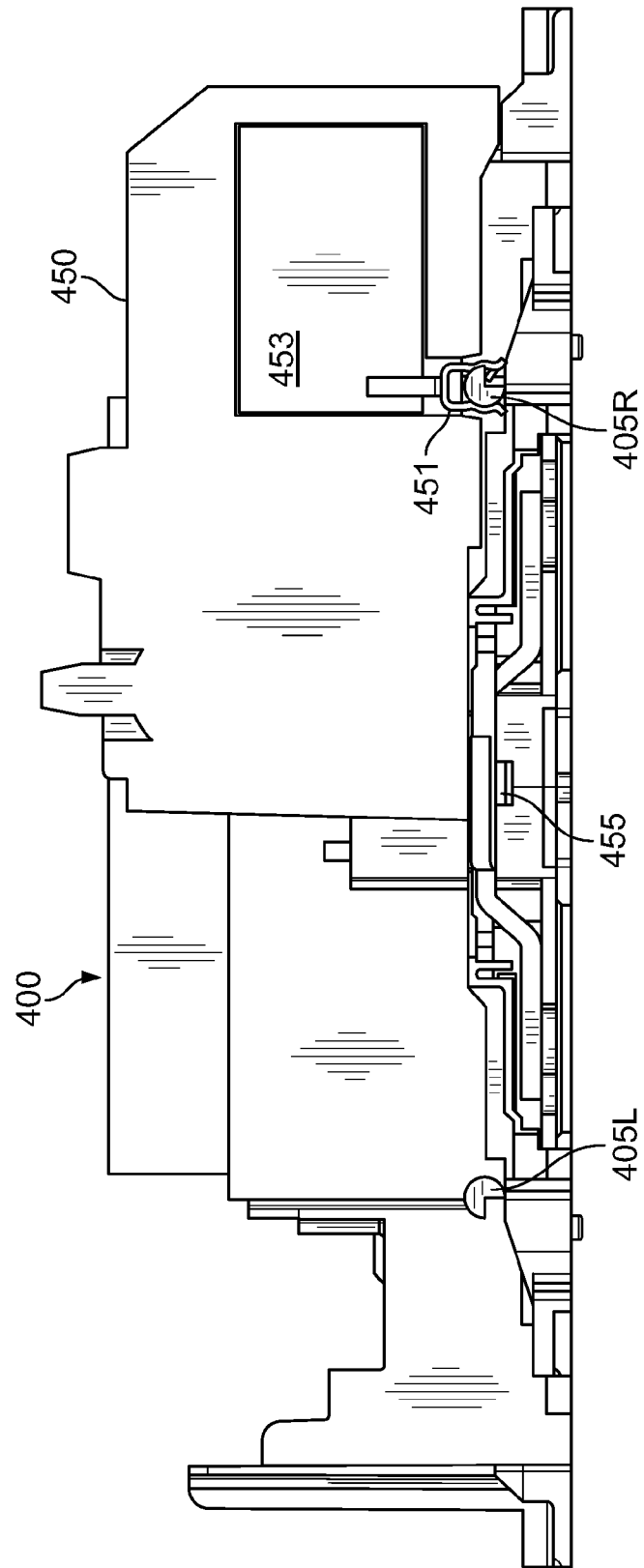
FIG. 6C is an end view of the electrical distribution panel and installed circuit breaker of FIG. 4.

FIG. 6A is a perspective close-up view of the plug-on neutral connector 451 shown in FIG. 5. The plug-on neutral connector 451 includes a retention feature in the form of a hooked retaining member 460 on a jaw surface of the connector 451, which prevents the circuit breaker 450 from being removed by rotating the circuit breaker 450 upward and toward the left. The hooked portion of the hooked retaining member 460 would catch against the cutout area 462 of the undercut positioning rail 403, discouraging disengagement of the plug-on neutral connector 451 therefrom. In other words, the retention feature of the undercut positioning rail corresponding to the cutout 462 is responsible for mechanically securing the circuit breaker 450 to the panel or loadcenter 400 in more than one axis, such as more than one axis of rotation. For example, the circuit breaker 450 cannot be mechanically separated from the panel 400 by merely pulling the circuit breaker 450 in one linear axial direction away from the panel 400. The hooked retaining member 460 helps to removal of the circuit breaker 450 by pulling it orthogonally away from the back or bottom surface of the panel or loadcenter 400. Aside from the retention feature, no further or additional mechanical couplings are required or necessary to mechanical secure the circuit breaker 450 to the panel or loadcenter 400 in more than one axis, though they are not precluded however unnecessary.

In all of the foregoing embodiments, AFI/GFI breakers of the type shown and ordinary circuit breakers may be of the same length. A variation of FIG. 1A can involve eliminating the neutral bars 105L,R of FIG. 1A, and electrically connecting the positioning rails 103L,R directly to panel neutral.

While particular aspects, embodiments, and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. An electrical distribution apparatus having a back surface, the apparatus comprising:
    a plurality of circuit breakers each having a line jaw connector and a plug-on neutral connector;
    a plurality of panel connectors engaging the line jaw connector of each of the plurality of circuit breakers and connecting each of the plurality of circuit breakers to electrical line current; and
    a conductive positioning rail engaging a corresponding plug-on neutral connector of each of the plurality of circuit breakers, wherein the positioning rail is connected to neutral, and includes a retention feature mechanically securing the plurality of circuit breakers to the electrical distribution apparatus in more than one axis;
    a neutral bus bar electrically connected to the positioning rail;
    wherein the conductive positioning rail is physically separate from the neutral bus bar, the positioning rail being connected to the neutral bus bar by a conductive shorting strap.

2. The apparatus of claim 1, wherein the positioning rail has a rounded top surface electrically engaging the plug-on connector, and wherein the retention feature includes a cutout along the bottom of the positioning rail thereby forming an undercut.

3. The apparatus of claim 1, wherein the conductive positioning rail has an angular cross section and wherein the retention feature corresponds to a bent portion of the positioning rail that receives the corresponding plug-on neutral connector of each of the plurality of circuit breakers.

4. The apparatus of claim 1, wherein the conductive positioning rail includes a bent-over portion with alternating tabs and recesses, wherein the plug-on neutral connector of each of the circuit breakers engages corresponding ones of the tabs.

5. The apparatus of claim 1, further comprising a second conductive positioning rail situated on an opposite side of an interior of the panel or load center from the conductive positioning rail.

6. The apparatus of claim 1, wherein the plug-on neutral connector of a first of the circuit breakers includes a hooked retaining member on a jaw surface thereof.

7. The apparatus of claim 6, wherein the first circuit breaker is installed by urging the circuit breaker toward the back surface of the distribution apparatus such that the line jaw connector and the plug-on neutral connector of the circuit breaker are engaged simultaneously by the panel connector and by the positioning rail, respectively.

8. The apparatus of claim 6, wherein the first circuit breaker is removed in a sequence of defined non-linear motions, wherein a first of the motions includes urging the circuit breaker in a direction away from the back surface such that the line jaw connector disengages from the panel connector and a second of the motions includes rotating the circuit breaker in a direction away from the panel connector.

9. An electrical distribution apparatus with a circuit breaker having a neutral line connection, the distribution apparatus comprising:
    a line jaw connector engaging a panel connector of the electrical distribution apparatus and connecting the circuit breaker to electrical line current; and
    a plug-on neutral connector electrically connected to a conductive positioning rail in the distribution apparatus, the conductive positioning rail being electrically connected to a neutral conductor carrying neutral current to the electrical distribution apparatus, the conductive positioning rail being physically separate from the neutral conductor, the positioning rail being connected to the neutral conductor by a conductive shorting strap, the positioning rail having a round top section and further including an undercut portion that receives the corresponding plug-on neutral connector to thereby mechanically secure the circuit breaker to the distribution apparatus in more than one axis.

10. The electrical distribution apparatus of claim 9, wherein the plug-on neutral connector of the circuit breaker is operable to mate with the conductive positioning rail in response to urging the circuit breaker in a direction perpendicular to a back surface of the distribution apparatus.

11. The electrical distribution apparatus of claim 9, wherein the plug-on neutral connector of the circuit breaker includes a hooked retaining member for preventing removal of the circuit breaker by rotational motion thereof.

12. The electrical distribution apparatus of claim 9, wherein the circuit breaker is an arc-fault detection or ground-fault detection circuit breaker that is compatible with the electrical distribution apparatus and is the same size as a circuit breaker without arc-fault detection or ground-fault detection capability, which is compatible with the same electrical distribution apparatus.

13. The electrical distribution apparatus of claim 9, wherein removal of the circuit breaker requires a sequence of defined non-linear motions in orthogonal directions, thereby securing the circuit breaker against accidental dislodgement.

14. An electrical distribution apparatus having a back surface, the apparatus comprising:
a plurality of circuit breakers each having a line jaw connector and a plug-on neutral connector;
a plurality of panel connectors engaging the line jaw connectors of the plurality of circuit breakers and connecting each of the plurality of circuit breakers to electrical line current; and
a conductive positioning rail connected to a neutral bus bar, the conductive positioning rail being physically separate from the neutral bus bar, the positioning rail being connected to the neutral bus bar by a conductive shorting strap, the positioning rail having a rounded top surface electrically engaging the plug-on neutral connectors, and a cutout on a surface of the positioning rail mechanically securing the circuit breaker to the electrical distribution apparatus in more than one axis.

* * * * *